Feb. 7, 1939. P. F. ROSSMANN 2,146,554
COOLING OF MACHINE GUNS
Filed Nov. 3, 1937

INVENTOR
PETER F. ROSSMANN.
BY
ATTORNEY

Patented Feb. 7, 1939

2,146,554

UNITED STATES PATENT OFFICE 2,146,554

COOLING OF MACHINE GUNS

Peter F. Rossmann, Kenmore, N. Y., assignor to Curtiss-Wright Corporation, a corporation of Delaware Application November 3, 1937, Serial No. 172,540

3 Claims. (Cl. 89—14)

This invention relates to cooling of machine guns, and particularly to means by which aircraft machine guns subject to rapid and continuous fire may be maintained at safe operating temperatures.

In the prior art, air cooling and water cooling have been resorted to for machine guns, and this invention has for an object the provision of cooling by the use of refrigerants or compressed gases. The invention is particularly adapted for use with machine guns used on aircraft, and the need for a cooling system of this kind may be visualized by the following: Military aircraft have ordinarily been equipped with two fixed machine guns, and the practical use of the guns contemplated interrupted fire which permitted the guns to cool between bursts. Now, requirements are that the aircraft be capable of almost continuous gun fire, and proposals to attain this end have included the use of a much greater number of guns, so that alternate use may be made of the guns to maintain a continuity of total fire, while permitting certain of the guns to stand by for cooling. The increased number of guns adds weight and control complication to the aircraft. Accordingly, I propose the use of refrigerating substances for the cooling of only a few guns on the aircraft, so that these guns may be used almost continuously without overheating.

Further objects will be apparent from a reading of the annexed specification together with an examination of the accompanying drawing, in which.

Figure 1:
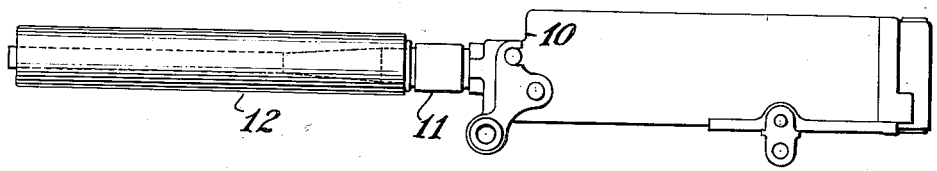
Fig. 1 is a side elevation of a machine gun equipped with the cooling tube of the invention.
Figure 2:
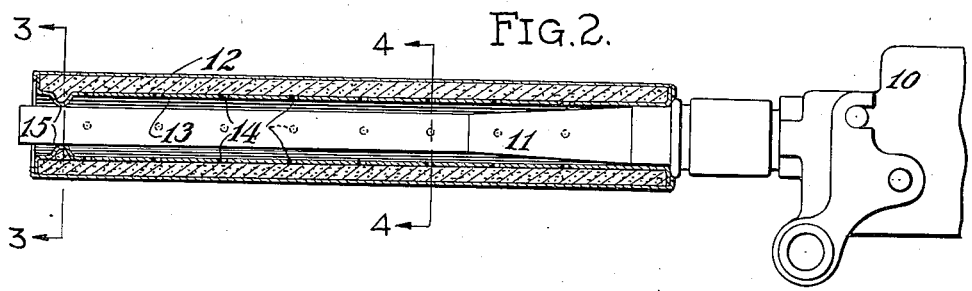
Fig. 2 is a longitudinal section of the cooling tube as applied to a gun.
Figure 3:
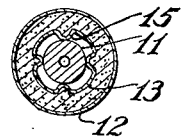
Figure 4:
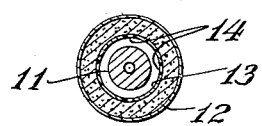
Figure 5:
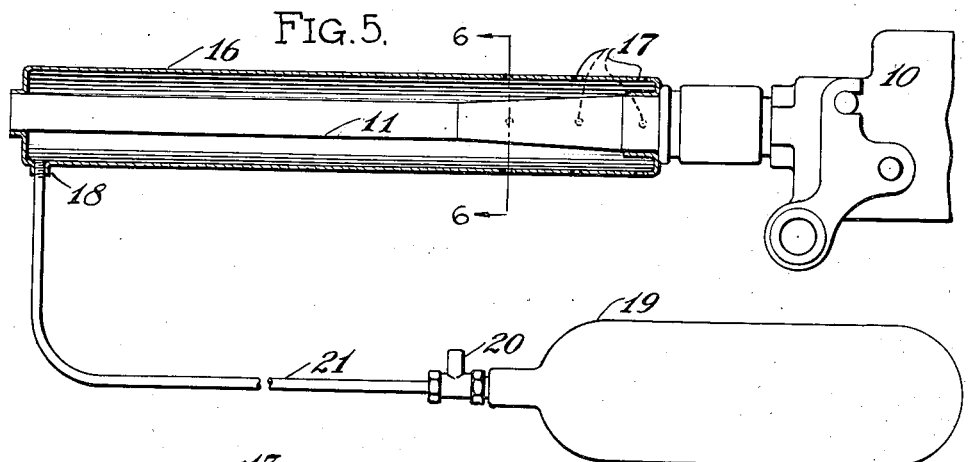
Figure 6:
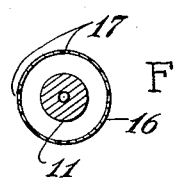

Figs. 3 and 4 are sections, respectively, on the lines 3—3 and 4—4 of Fig. 2;

Fig. 5 is a longitudinal section through an alternative form of cooling device, as applied to a gun; and Fig. 6 is a section on the line 6—6 of Fig. 5.

In the drawing, the conventional type of machine gun is shown at 10, the barrel 11 of the gun being embraced, as shown in Figs. 1 to 4, by a double-walled detachable cooling device 12, the outer wall thereof being imperforate, and the inner wall 13 being perforate as at 14. The inner wall is of such a size at its rearward end as to fit snugly over the breach end of the barrel 11, while indentations 15 are formed in the forward end of the wall 13 to engage, at spaced apart points, the periphery of the forward end of the barrel. The space between the walls 12 and 13 is filled with $CO_2$ snow, commonly known as dry ice which, as is well known, has a very effective refrigerating effect. The perforations 14, and the space between the indentations 15 provides for evaporation of the $CO_2$ whereby the cooling effect is obtained. In use, it is contemplated that a plurality of the units 12 be available at ground stations, and that prior to take-off, the machine guns of the aircraft be fitted with freshly filled cooling assemblies. During flight, the cooling tubes will have a constant cooling and refrigerating effect upon the gun barrel to prevent overheating thereof during firing. The rate of evaporation of dry ice is sufficiently low, so that a single cooling device 12 will last for an adequate period of time.

An alternative arrangement for cooling the gun is shown in Figs. 5 and 6, wherein a tube 16 is flanged at its ends to closely engage the breech and muzzle ends of the barrel 11. Perforations 17 are formed toward the breech end of the tube 16, to permit of outflow of gas fed within the tube, and a connection 18 is provided at the muzzle end, to which a pressure bottle 19, having a valve 20, is attached by a tube 21. The pressure baffle may be filled with liquefied gas such as methyl chloride, carbon dioxide, or oxygen. In this arrangement, the expendible part of the assembly comprises the pressure bottle 19, the tube 16 remaining on the gun. In operation, the aircraft crew may open the valve 20 when protracted gun fire is anticipated, whereupon liquefied gas flows through the tube 21 into the tube 16, where it vaporizes for cooling the gun, the vapor passing to the atmosphere through the openings 17. The valve 20 may be located in a position convenient for operation by the aircraft crew.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. Means for cooling an aircraft machine gun comprising a demountable assembly including a perforate tube embracing the gun, an imperforate tube embracing the perforate tube, and a vaporable solid substance between said tubes for evaporation through the perforations of the first tube in proximity to the gun barrel.

2. A cooling assembly for a gun barrel comprising a demountable assembly including a perforate tube having clearance relation with the barrel except at its rearward end, an imperforate tube in annularly spaced relation with the perforate tube, and a vaporable solid substance contained within the annular space between said tubes adapted to vaporize and issue vapor through the inner tube perforations toward the gun barrel.

3. A replaceable cooling device for a gun having a barrel requiring cooling, comprising a pair of concentric tubes attached to one another at their ends and defining therebetween a space, the inner tube being perforate and having clearance relation with the gun barrel except at it rearward end whereat it fits the barrel closely inward projections in the inner tube at its forward end organized when the tube is slipped ove the barrel to engage the forward end thereo to hold the tube assembly in concentric relatio and to provide vent openings between the projections and barrel, and a solid vaporable substance packed between the tubes in said spac adapted to issue vapor through the perforation of the inner tube toward the gun barrel fo cooling the latter.

PETER F. ROSSMANN.